US011958650B2

(12) United States Patent
Baechle et al.

(10) Patent No.: US 11,958,650 B2
(45) Date of Patent: Apr. 16, 2024

(54) METHOD FOR PRODUCING PACKAGINGS AND PACKAGING SYSTEM FOR EXECUTING THE METHOD

(71) Applicant: Syntegon Packaging Systems AG, Beringen (CH)

(72) Inventors: Andreas Baechle, Rickenbach (DE); Philipp Kuettel, Hochfelden (CH); Roger Meili, Löhningen (CH)

(73) Assignee: Syntegon Packaging Systems AG, Beringen (CH)

( * ) Notice: Subject to any disclaimer, the term of this patent is extended or adjusted under 35 U.S.C. 154(b) by 0 days.

(21) Appl. No.: 18/156,537

(22) Filed: Jan. 19, 2023

(65) Prior Publication Data

US 2023/0234741 A1 Jul. 27, 2023

(30) Foreign Application Priority Data

Jan. 26, 2022 (DE) ..................... 10 2022 101 836.9

(51) Int. Cl.
*B65B 43/10* (2006.01)
*B65B 5/02* (2006.01)
(Continued)

(52) U.S. Cl.
CPC ............ *B65B 65/003* (2013.01); *B65B 5/024* (2013.01); *B65B 35/10* (2013.01); *B65B 35/24* (2013.01);
(Continued)

(58) Field of Classification Search
CPC ......... B65B 5/024; B65B 5/028; B65B 35/10; B65B 35/24; B65B 43/10; B65B 43/126;
(Continued)

(56) References Cited

U.S. PATENT DOCUMENTS 4,578,929 A * 4/1986 Tisma ..................... B65B 43/10
53/251
4,642,974 A * 2/1987 Macmorine et al. ... B31B 50/36
493/438
(Continued)

FOREIGN PATENT DOCUMENTS

DE 102017208856 A1 * 11/2018 ........... B65B 59/005
EP 0882662 A1 12/1998
(Continued)

OTHER PUBLICATIONS

German Patent Office Action for Related Application No. 102022101836.9 dated Nov. 10, 2022 (9 pages, including an English translation).

(Continued)

*Primary Examiner* — Stephen F. Gerrity
(74) *Attorney, Agent, or Firm* — Michael Best & Friedrich LLP

(57) ABSTRACT

A method for producing packagings (12*a*; 12*b*), in particular cartons, in which in at least one method step packaging parts (32*a*; 32*b*), in particular carton parts, are conveyed by a transport device (14*a*; 14*b*) having a planar drive. The packaging parts (32*a*; 32*b*) are in each case moved via at least one platform (30*a*; 30*b*) of the transport device (14*a*; 14*b*) which is movable by the planar drive, and are processed during a movement that is induced by the platform (30*a*; 30*b*). At least one processing step for producing a packaging (12*a*; 12*b*) from a packaging part (32*a*; 32*b*) is realized at least partly by a force generated by the at least one movable platform (30*a*; 30*b*).

13 Claims, 4 Drawing Sheets

(51) Int. Cl.

| | |
|---|---|
| ***B65B 35/10*** | (2006.01) |
| ***B65B 35/24*** | (2006.01) |
| ***B65B 43/60*** | (2006.01) |
| ***B65B 51/02*** | (2006.01) |
| ***B65B 65/00*** | (2006.01) |
| *B31B 50/04* | (2017.01) |
| *B31B 50/36* | (2017.01) |
| *B31B 50/62* | (2017.01) |
| *B65B 43/26* | (2006.01) |
| *B65B 43/42* | (2006.01) |
| *B65B 59/00* | (2006.01) |

(52) U.S. Cl.

CPC .............. *B65B 43/10* (2013.01); *B65B 43/60* (2013.01); *B65B 51/02* (2013.01); *B31B 50/04* (2017.08); *B31B 50/36* (2017.08); *B31B 50/624* (2017.08); *B65B 43/265* (2013.01); *B65B 43/42* (2013.01); *B65B 59/003* (2019.05)

(58) Field of Classification Search

CPC ....... B65B 43/265; B65B 43/42; B65B 43/60; B65B 51/02; B65B 59/003; B65B 65/003; B31B 50/003; B31B 50/04; B31B 50/36; B31B 50/624

USPC .................................................... 53/456, 458

See application file for complete search history.

(56) References Cited

U.S. PATENT DOCUMENTS

| | | | | |
|---|---|---|---|---|
| 9,540,141 | B2 * | 1/2017 | Kurz et al. | B65B 5/04 |
| 2003/0136086 | A1 | 7/2003 | Kalany et al. | |
| 2006/0084560 | A1 * | 4/2006 | Martini | B31B 50/04 493/438 |
| 2006/0117716 | A1 * | 6/2006 | Bonnain et al. | B65B 5/024 53/466 |
| 2012/0011808 | A1 * | 1/2012 | Langen et al. | B65B 5/024 53/235 |
| 2015/0375880 | A1 * | 12/2015 | Ford et al. | B65B 43/52 53/147 |
| 2016/0207658 | A1 * | 7/2016 | Bellante | B65B 35/10 |
| 2016/0244273 | A1 | 8/2016 | Schaeuble | |
| 2016/0257089 | A1 * | 9/2016 | Deering | B65B 5/024 |
| 2017/0341875 | A1 * | 11/2017 | Baechle | B65B 43/126 |
| 2020/0002040 | A1 * | 1/2020 | von Birgelen et al. | B65B 43/10 |
| 2023/0294929 | A1 * | 9/2023 | Okazaki et al. | B65B 35/24 198/803.7 |

FOREIGN PATENT DOCUMENTS

| | | | |
|---|---|---|---|
| EP | 3265305 | B1 | 9/2020 |
| GB | 2561826 | A | 10/2018 |
| WO | 2015055529 | A1 | 4/2015 |
| WO | 2018176137 | A1 | 10/2018 |
| WO | 2021019007 | A1 | 2/2021 |
| WO | 2022117524 | A2 | 6/2022 |

OTHER PUBLICATIONS

Partial European Search Report for Application No. 23153364.7 dated Jul. 31, 2023 (35 pages, English translation included).

European Patent Office Extended Search Report for Application No. 23153364.7 dated Nov. 21, 2023 (34 pages including English translation).

* cited by examiner

METHOD FOR PRODUCING PACKAGINGS AND PACKAGING SYSTEM FOR EXECUTING THE METHOD

CROSS REFERENCE TO RELATED APPLICATION

The present application claims the benefit of German patent application DE 10 2022 101 836.9 filed on Jan. 26, 2022, the entire content of which is hereby incorporated by reference herein.

BACKGROUND

Methods for producing packagings have already been proposed, for example by means of a top-loading packaging device, of a carton erector, of a tray former, or of a lidding device. This usually requires several process paths for preparing and closing the packagings. For further processing steps, like inspecting, gluing, etc., in each case further process paths are used. Therefore, large transport systems and/or packaging systems are necessary which must be connected to one another, and which moreover need to be implemented in each case for a packaging type that is to be produced.

In WO 2018/176137 A1 a transport system with a planar drive is proposed, wherein objects can be transported via movable platforms.

The objective of the invention lies in facilitating the production of packagings with all processing steps required therefor on a single flexible process path.

SUMMARY

A method for producing packagings, in particular cartons, is proposed, wherein in at least one method step packaging parts, in particular carton parts, are conveyed by means of a transport device having a planar drive, wherein the packaging parts are in each case moved via at least one platform of the transport device which is movable by the planar drive and are processed during a movement that is induced by the platform, wherein at least one processing step for producing a packaging from a packaging part is realized at least partly by a force generated by the at least one movable platform.

Preferably, for a transport of the packaging parts/packagings, the platforms of the transport device are moved along a stator of the transport device by a combination of a magnetic force and an airflow applied at the platforms, wherein the platforms move at a distance from the stator. In particular, the platforms are held in a proximity of the stator by the magnetic force, which in particular acts between the stator and the individual platforms. Preferentially the platforms are moved along the stator in each case by a force based on the reluctance principle, wherein the platforms are in particular in each case subjected to a reluctance force via a magnetic resistance that changes in a proximity of the platforms at the stator. In particular, the platforms are in each case freely movable, independently from fix tracks, along a maximum effective surface of the stator. In particular, in a movement of the platforms along the stator no friction force acts between the stator and the individual platforms. In particular, the platforms are subjected to a force by the stator through the effective surface.

Preferably, during a transport the individual packaging parts/packagings are transported by the transport device, in particular section-wise and/or temporarily, by means of a platform, of two platforms and/or of several platforms.

Preferentially the packaging parts/packagings are supported on the platforms and/or held, for example clamped, by the platforms. Alternatively or additionally it is conceivable that the packaging parts/packagings are held on the platforms via holding elements, for example suckers, clamping devices, or the like. It is conceivable that during the transport by means of the transport device, the packaging parts/packagings stand on the platforms or hang from the platforms. Preferably the packaging parts are in at least one method step subjected to a force during a movement that is induced by the platform(s) transporting the respective packaging part.

Preferentially, for producing the packagings the packaging parts are moved by means of the transport device along at least one production path, which preferably extends along the stator, in particular at least substantially parallel to the effective surface of the stator. It is conceivable that the at least one production path is dynamically adapted during a transport of a packaging part, depending on at least one process parameter or several process parameters, e. g. a packaging type that is to be produced, a packaging part that is to be transported via the/a platform, a product type that is to be filled into the packaging or the like, wherein in particular the respective platform/s is/are moved over a different distance via the stator.

Preferably the transport device is part of a packaging system which is configured for producing the packagings and for filling the produced packagings. Preferably, during a transport via the platforms of the transport device, the produced packagings are filled/loaded, in particular with products. In particular, filling/loading of the packagings/packaging parts is carried out by means of at least one product feed of the packaging system during or after a production of the packagings in a transport by the transport device. Particularly preferentially, the packagings are produced from packaging parts during a transport by the transport device, in particular via the platforms, and are herewith or afterwards filled/loaded with products during the transport by the transport device, in particular via the platforms. Preferentially, during a transport by the transport device the packaging parts are moved via the platforms to at least one packaging station of the packaging system, wherein in particular the packaging parts are processed for a production of the packagings. The at least one packaging station comprises at least one tool for a processing of the packaging parts, preferentially during a relative movement of the respective packaging part that is to be processed and is transported via a platform and the tool. Particularly preferentially, during a transport via one or several platform/s of the transport system, the packaging parts are processed for producing the packagings. Particularly preferentially, the produced packagings are filled/loaded during a transport via one or several platform/s of the transport system. It is also conceivable that the packagings are filled/loaded during production, wherein in particular a production of the packagings is completed after filling/loading.

For example, the packaging parts are embodied as carton blanks, as plastic elements, as wooden components, or the like. It is conceivable that the packaging parts are preprocessed, for example cut, coated and/or glued during the transport by the transport device. Alternatively or additionally it is conceivable that the packaging parts are checked and/or inspected during the transport by the transport device, in particular in order to ensure sufficiently high quality of the packaging parts before or during the production of the packaging. Alternatively or additionally it is conceivable that the packaging parts are checked and/or inspected during the transport by the transport device, for example before filling/loading or before closing. Preferentially in at least one point of the packaging system, in particular of the transport device, a transfer is realized of packaging parts and/or blanks of the packaging parts to the transport device, in particular to a platform or several platforms of the transport device, preferentially by a user and/or by means of a feeding unit.

The implementation of the method according to the invention allows an advantageously flexible and modular production of packagings by a single process path. It is in particular possible that necessary movements of the packaging parts are realized at least largely or exclusively via the platforms, as a result of which in particular advantageously simple and cost-efficient implementations of packaging stations at the transport device are facilitated.

It is further proposed for an execution of processing steps for producing a packaging, in at least one method step a packaging part passes through a plurality of packaging stations in succession during a transport via a movable platform. An advantageously compact process path is enabled. An advantageously simple and cost-efficient implementation of the individual packaging stations is enabled, in particular as the packaging stations are actuated directly via the platforms. Preferably a processing of the packaging part/s is realized during a transport via a/the platform. It is conceivable that the packaging part is temporarily stopped at at least one of the packaging stations for processing. Preferentially the packaging part is processed in the packaging stations with at least one tool respectively. Preferentially, during the transport via the platform, the packaging part is moved/processed successively via a plurality of packaging stations of the packaging system. Preferentially, in at least one method step a plurality of packaging stations of the packaging system that are to be actuated are selected for each packaging part, in particular depending on the process parameter, on an availability of the respective packaging stations, on a numbering of the packaging part in a series of packaging parts, for example for a regular check of packaging parts or of produced packagings, or the like. Preferentially, an actuation of the transport device for an individual controlling of the respective platforms is carried out by means of a control unit of the packaging system. In particular, for a production of the packagings the individual packaging stations or at least part of the packaging stations, in particular of the tools, preferably of the driven and/or controllable tools, are controlled by means of the control unit.

It is moreover proposed that for producing a packaging from a packaging part, in at least one method step at least one processing step is carried out by at least two movable platforms which move relative to each other. It is advantageously possible to do without additional devices and/or tools for an execution of the respective processing step, for example for rotating or for lifting the packagings/the packaging parts or for something like that. This enables an advantageously compact and cost-efficient process path. It is conceivable that a packaging part is transported by at least two platforms moving at least substantially synchronously along the stator. In particular, for transport and/or for processing the packaging part lies simultaneously upon the at least two platforms or is clamped by the at least two platforms. Preferably the packaging part is in at least one method step, in particular the method step, processed, for example folded, deformed, rotated or the like, by the at least two movable platforms moving relative to each other. In addition it is conceivable that in at least one method step, in particular the method step, the packaging part is processed, for example folded, deformed, rotated or the like, by an interaction with a tool and a simultaneously realized relative movement of the at least two movable platforms. It is conceivable that the at least two platforms are moved relative to each other within a plane, which is in particular oriented at least substantially parallel to the effective surface of the stator, and/or are moved, viewed along the effective surface of the stator, at least substantially perpendicularly to the effective surface of the stator.

Furthermore, it is proposed that in at least one method step at least one processing step for producing a packaging from a packaging part is carried out by a direct interaction of the packaging part moving via a movable platform with a tool that is implemented at least substantially immobile relative to the movable platform. An advantageously simple and cost-efficient implementation of the individual packaging stations is enabled, in particular as the packaging parts are movable exclusively via the platforms. In particular, the tool that is implemented at least substantially immobile relative to the movable platform is embodied as a discharge element, for example a nozzle or a different opening, for discharging an adhesive material or as a slotted link, as an edge, or something like that. Alternatively or additionally it is conceivable that in at least one method step at least filling/loading of a packaging part/a packaging is realized in a transport via a movable platform, in particular during or in between a movement, by means of a tool which is implemented at least substantially immobile relative to the movable platform and which is in particular embodied as a filling tool, for example as a closable opening, as an outlet of a conveyor belt, as a releasable gripper or suction element or something like that, for a filling/loading of the packaging parts, respectively of the packagings. Preferentially the packaging part is processed in the processing step. Preferably the packaging part interacts with the tool in a force-fit and/or form-fit manner for an execution of the processing step. For example, at least a portion of the packaging part is moved, for example folded, bent and/or displaced, relative to the remaining portion of the packaging part by an interaction with the tool, which is in particular embodied as a slotted link, as an edge or something like that. For example, the packaging part is coated and/or provided with an adhesive material via the tool, which is in particular embodied as a discharge element, during the processing step. "Substantially immobile" is in particular to mean an implementation of a tool in which a processing region of the tool, for example a contact surface of the tool for an interaction with a packaging part, a discharge opening for applying an adhesive material on a packaging part and/or a discharge opening for discharging a product for filling/loading the packaging parts/packagings, is implemented so as to be immobile relative to the stator, in particular to the effective surface of the stator, during the method for producing the packagings. It is in particular conceivable that a tool that is implemented at least substantially immobile comprises movable and/or driven components, for example for a cutting or for a partial folding back of packaging parts, wherein a processing region formed by the tool, in particular the components, is implemented so as to be immobile relative to the stator, in particular the effective surface of the stator, during the method for producing the packagings. Alternatively, it is also conceivable that the packaging system comprises packaging stations and/or tools which are implemented so as to be movable, in particular movable in a driven manner, relative to the stator, in particular the effective surface of the stator, and whose position is preferably changed during the method at least temporarily, in particular by means of a computing unit and/or control unit.

Beyond this it is proposed that for producing a packaging, in at least one method step an adhesive material is applied onto a packaging part by means of the tool during a movement of the packaging part that is transported via a movable platform or several movable platforms. An advantageously simple and flexible production of packagings with gluing points is enabled. It is preferably possible to dispense with movable tools for applying the adhesive material, in particular as the packaging parts are moved via the platforms. Preferably, for a production of a packaging, in a further method step, during a movement of the packaging part that is transported via a movable platform of several movable platforms, at least one region of the packaging part that is provided with the adhesive material is connected to a further portion of the packaging part and/or to a further packaging part, for example by folding, bending, joining or something like that, preferably by means of a further tool of the packaging system. Alternatively or additionally it is conceivable that for producing a packaging, in at least one method step, during a movement or a transport via a movable platform or several movable platforms, a packaging part is riveted, clamped and/or stapled by means of at least one tool of the packaging system for the purpose of connecting respective regions of the packaging that is to be produced.

It is moreover proposed that for a production of a packaging, in at least one method step a packaging part that is transported via a movable platform or several movable platforms is folded during a movement. An advantageously simple and flexible production of rather complex packagings is enabled. An additional movable tool for folding the packaging parts may advantageously be dispensed with. Preferably, when folding a packaging part at least one wall of the packaging part is moved relative to at least one further wall of the packaging part, in particular around a common axis, wherein preferably the at least one wall and the at least one further wall are realized in a one-part implementation. In particular, the at least one wall and/or the at least one further wall are/is—in particular in each case—moved by an interaction with at least one tool. It is conceivable that the at least one wall is supported by means of the platform/s and the at least one further wall is moved relative to the at least one wall by means of the at least one tool. Alternatively or additionally it is conceivable, in particular in another method step, that the packaging part is supported by the platform, wherein for a folding of the packaging part the at least one wall interacts with at least one tool and the at least one further wall interacts with at least one further tool, wherein preferentially the at least one wall and the at least one further wall are moved relative to each other, and in particular relative to the platform. In particular, for an interaction with the at least one wall and/or the at least one further wall, and/or for folding the packaging parts, the tool/s is/are implemented so as to form slotted links, edges or the like, wherein in particular the packaging parts, in particular the at least one wall and/or the at least one further wall, respectively interact with the tools via a movement that is generated by the movable platforms. In particular, for an interaction with the at least one wall and/or the at least one further wall, and/or for folding the packaging parts, the tool/s is/are implemented at least substantially immobile relative to the movable platforms. Preferentially, in at least one method step, in particular before a transfer of the packaging part to the transport device or in a preceding processing step, at least one pre-fold seam is introduced into the packaging parts during a transport by the transport device, a folding of the packaging part being realized at the at least one pre-fold seam during the movement via the platform/s.

Furthermore, it is proposed that for a production of a packaging, in at least one method step a packaging part that is transported via several movable platforms is rotated around at least one axis by a relative movement of the movable platforms. An advantageously high degree of freedom is achievable with the packaging parts being moved via the platforms. Preferably, the packaging part is rotated around an axis that is oriented at least substantially perpendicularly to the effective surface of the stator and/or around an axis that is oriented at least substantially parallel to the effective surface of the stator. Alternatively or additionally it is conceivable that the packaging part is rotated by the relative movement around an axis that is oriented obliquely to the effective surface of the stator. For example, in at least one method step packaging parts are rotated, preferably following a processing step, for an inspection of the packaging parts, wherein the packaging parts may in particular be inspected independently by a movable sensor, like for example a camera or the like. Alternatively or additionally it is conceivable that in at least one method step, for an application of an adhesive material onto individual packaging parts, the packaging parts are rotated, preferably relative to a tool through which the adhesive material is discharged, and which is in particular implemented at least substantially immobile. Alternatively or additionally it is conceivable that in at least one method step, for a folding of packaging parts, the packaging parts are rotated relative to a tool that is implemented as a slotted link or as an edge, and is in particular implemented at least substantially immobile, wherein in particular regions of the individual packaging parts can be moved over a larger folding angle compared in each case to packaging parts which are moved only translationally during the folding. Preferably the packaging parts are in at least one method step rotated around the axis, by means of at least one platform or by a relative movement of several movable platforms, by at least 90°, preferably by at least 140° and particularly preferentially by at least 180°. It is also conceivable that the packaging parts are in at least one method step rotated spatially around more than one axis by means of at least one platform or by a relative movement of several movable platforms. For example, the packaging parts/packagings are rotated for a registration of a surface and/or of a wall of the individual packaging parts, which is carried out/intended in the method step and/or in a further method step. It is conceivable that the packaging parts are rotated for a registration of an identifier, for example a barcode, a QR code or the like, and/or of glued and/or differently coated surfaces of the packaging parts. For example, a rotation of the packaging parts is executed in such a way that in a further method step, for example when passing through a further packaging station, a printed/coated side of the packaging parts faces toward a camera and/or toward a different registering element.

It is also proposed that the packaging parts are transported by means of the transport device along one of at least two different possible predetermined production paths, wherein for checking a processing step, in particular at regular intervals, in at least one method step packaging parts are conveyed on a movable platform, instead of via one of the production paths, onto another production path. In an advantageously simple and flexible manner, different movement paths of packagings and/or packaging parts may be enabled during production, for example for an inspection of individual executed processing steps and/or of produced packagings. It is advantageously possible to facilitate, at the same time and by means of a single transport device, different process paths for different production methods and/or for different packagings to be produced. In particular, the different production paths run via a different number of packaging stations and/or product feeds, and/or via respectively different packaging stations and/or product feeds, of the packaging system. Preferably the packaging parts are in each case assigned one of the different production paths by the computing unit and/or control unit, depending on the process parameter of the respective packaging part. Preferentially, the platform/s transporting the respective packaging part is/are controlled such that the packaging part moves along the production path assigned to the respective packaging part. For example, following a processing step, packaging parts are transported onto a different production path at regular intervals, e. g. one packaging part every three minutes and/or every tenth packaging part, said different production path in particular comprising a packaging station for an inspection of the packaging parts, preferentially for checking a quality of the processing step. Alternatively or additionally it is conceivable that packagings and/or packaging parts are filled/loaded with a product from a plurality of different products and/or with a different number of products, wherein the production paths in particular in each case comprise one of several different product feeds and/or extend through one of several different product feeds. It is conceivable that the different production paths are predetermined by a user and/or by an external unit and are stored in the control unit, or are determined by the control unit depending on the process parameter of the individual packaging parts/packagings, on a position or an implementation of the individual packaging stations and/or of the individual product feeds and/or on at least one method parameter given by the user, like for example a maximal packaging time for producing and filling the packagings, an inspection rate for the respective processing steps or the like. It is conceivable that, in particular during the method, predetermined production paths are adapted by means of the control unit depending on the process parameter of the individual packaging parts/packagings, on a position or an implementation of the individual packaging stations and/or of the individual product feeds and/or on at least one method parameter given by the user, like for example a maximal packaging time for producing and filling the packagings, an inspection rate for the respective processing steps or the like.

Beyond this it is proposed that in at least one method step products are put into packagings or packaging parts during a transport by the transport device, wherein at least one movable platform actuates a product feed of a plurality of product feeds depending on an availability of products at the respective product feed. An advantageously flexible, situation-related filling of the packagings on a production path of the packagings is enabled. Preferably a production of the packagings and a filling of the packagings via a single process path is facilitated. In particular, the individual product feeds of the plurality of product feeds are respectively arranged on one of the different production paths. It is conceivable that via the individual product feeds of the plurality of product feeds, respectively different products are outputted or that a same product is outputted. In particular, in each case an availability of the product outputted at the respective product feed is transmitted to the control unit by the product feeds, wherein in particular by means of the control unit, the movable platforms are respectively actuated for a movement to a product feed that is loaded with product or to a product feed that is going to be loaded with products at an earliest point in time.

It is further proposed that in at least one method step a plurality of different packaging types is produced at least substantially simultaneously by means of the transport device, wherein for producing one of the packaging types, the movable platforms of the transport device are moved, depending in each case on a type of a packaging part transported via the respective platform, on a predetermined production path that is assigned to the respective packaging type. An advantageously great number of different packaging types can be produced simultaneously via a single process path/transport device. A production of packagings is achievable that is advantageously optimized with regard to requirements, in particular depending on a product type and/or on a size of products to be packaged, which may in particular be supplied at the transport device. It is conceivable that in a transfer of a packaging part/of the blank of a packaging part to the packaging system, a packaging type of the packaging part to be transported is identified and/or predetermined and/or is registered by means of a sensor unit or the like of the packaging system. In particular, the individual movable platforms are in each case assigned a packaging type, which in particular in each case corresponds to the packaging type of a packaging part transported via the respective platform. Preferentially the individual packaging types to be produced are in each case assigned a production path, and/or a respective production path is determined for the individual packaging types to be produced. In particular, the different production paths are realized, perpendicularly to the effective surface of the stator, differently from one another. Alternatively or additionally it is conceivable that the different production paths have, in at least one region of the stator, a respectively different minimal distance from the stator, in particular the effective surface, wherein in particular the platforms are moved along the stator at respectively different heights. For example, it is conceivable that for producing a first packaging type, packaging parts are moved past a tool via the platforms at a first height relative to the stator, wherein in particular a wall of the packaging parts is folded, and for producing a second packaging type, packaging parts are moved past the tool via the platforms at a second height relative e to the stator, which is in particular realized larger or smaller than the first height, wherein in particular a wall of the packaging parts is folded. In particular, packaging parts for producing the first packaging type and packaging parts for producing the second packaging type have different dimensions.

Moreover, it is proposed that in at least one method step, for a transport of a packaging part, for a processing step for producing a packaging, at least one movable platform is moved in a direction that is oriented transversally to a stator, in particular the aforementioned stator, of the transport device, wherein in the processing step the packaging part is at least partlly deformed and in particular the minimal distance of the stator and the platform is increased. Advantageously, processing steps are enabled wherein the packaging parts can be at least partly moved spatially, in particular out of a transport plane, and/or can be processed. An advantageously high degree of freedom is attainable in moving the packaging parts via the platforms. In particular, for the processing step the movable platform is moved transversally to the effective surface of the stator, preferably away from the stator, in particular away from the effective surface of the stator. Preferably the movement of the movable platform transversally to the stator is brought about in a region of the stator by an increase of a flowthrough of air through the effective surface and/or by a reduction of the magnetic field in the region of the stator, which is in particular controlled by means of the control unit. For example, a packaging part that is transported via two movable platforms is deformed or folded in a processing step by a movement of one of the two movable platforms transversally to the stator, in particular relative to the other movable platform, wherein in particular one wall is adjacent to the platform and a further wall is adjacent to the other wall. Alternatively or additionally it is conceivable that putting tabs and/or walls of the packaging part together is brought about via a movement of a platform transversally to the stator in an interaction with a tool.

Furthermore, a packaging system is proposed for executing a method according to the invention for producing packagings, with at least one transport device having a planar drive. The transport device preferably comprises a plurality of movable platforms and at least one, in particular the aforementioned, stator. Preferentially the movable platforms are implemented so as to be movable along the stator, in particular the effective surface, independently from one another such that they are controllable via the stator. Preferentially the packaging system comprises the control unit. Preferably the packaging system comprises at least one packaging station and at least one product feed. It is conceivable that the packaging system comprises a plurality of packaging stations and/or a plurality of product feeds. Preferentially the control unit is configured for controlling the movable platforms in a movement along the stator independently from one another via the stator. In particular, the control unit is configured, for a controlling of the movable platforms, to control and/or regulate the magnetic field generated in a proximity of the effective surface of the stator and/or the flowthrough of air through the effective surface of the stator. Preferably the packaging station/s and/or the product feed/s of the packaging system are/is respectively arranged at least in a proximity of the transport device, in particular of the stator, preferably at least partially on or at an outer side of the stator that comprises the effective surface. In particular, the proximity of the transport device, in particular of the stator, extends within a minimal distance, oriented perpendicularly to the effective surface, of maximally 1 m, preferably maximally 80 cm and particularly preferentially maximally 50 cm. In particular, the minimal distance depends on a dimension of the packagings that are to be produced. It is conceivable that the packaging station/s and/or the product feed/s of the packaging system are/is in each case or partly arranged, in particular fastened, at the transport device, or are installed separately from the transport device.

The implementation of the packaging system according to the invention enables advantageously flexible and modular production of packagings. In particular, required movements of the packaging parts can be realized at least largely or exclusively via platforms of the transport device, which in particular facilitates advantageously simple and cost-efficient implementations of packaging stations on the transport device. This allows attaining advantageously low production costs of the packaging system.

The method according to the invention and/or the packaging system according to the invention shall herein not be limited to the application and implementation described above. In particular, in order to fulfill a functionality that is described here, the method according to the invention and/or the packaging system according to the invention may comprise a number of individual elements, components and units as well as method steps that differs from a number given here. Furthermore, in the value ranges given in the present disclosure values situated within the limits mentioned shall also be considered as disclosed and as applicable according to requirements.

BRIEF DESCRIPTION OF THE DRAWINGS

Further advantages will become apparent from the following description of the drawing. In the drawing two exemplary embodiments of the invention are illustrated. The drawing, the description and the claims contain a plurality of features in combination. Someone skilled in the art will purposefully also consider the features individually and will find further expedient combinations.

It is shown in.

DETAILED DESCRIPTION

Figure 1:
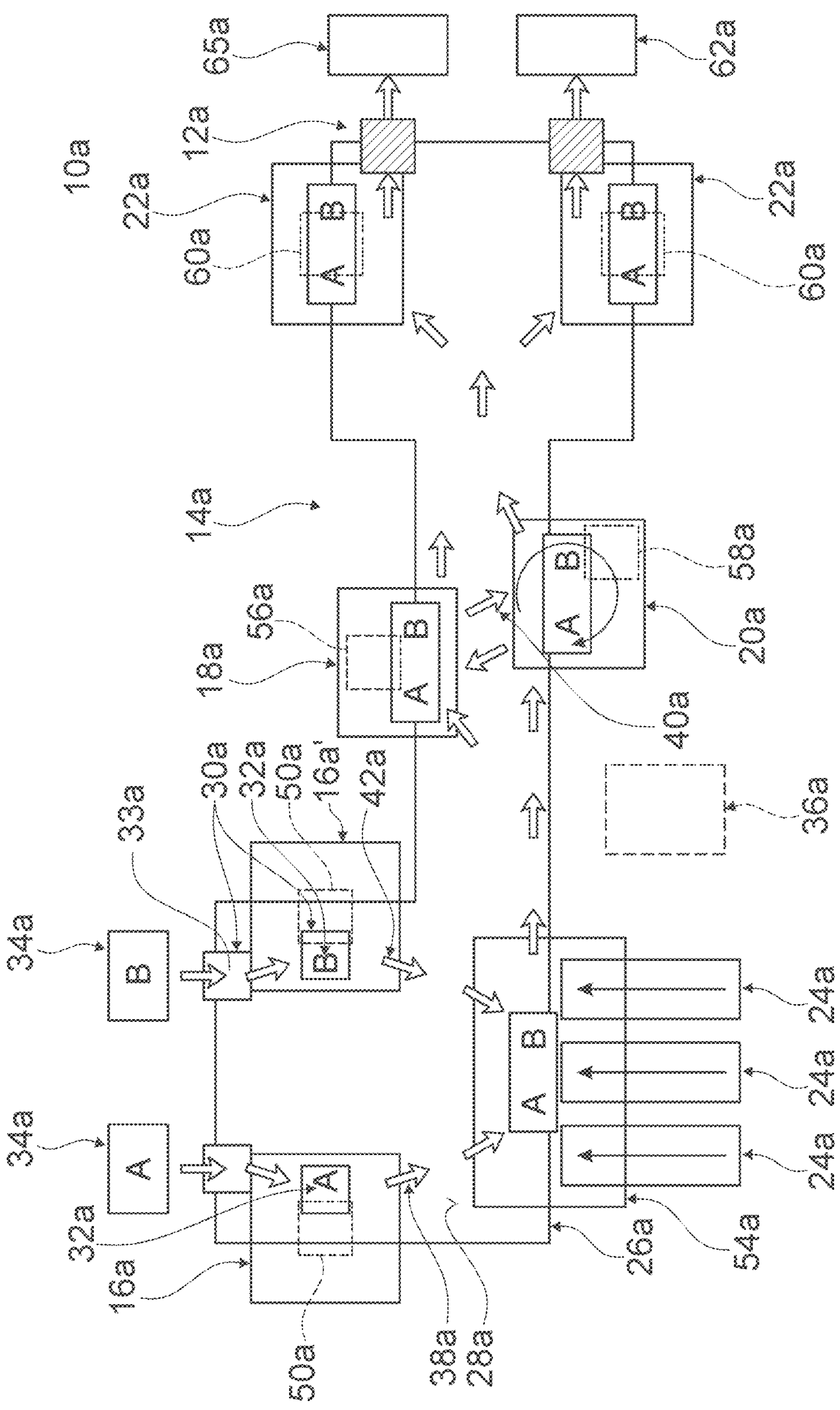
FIG. 1 a schematic illustration of a packaging system according to the invention for executing a method according to the invention for producing packagings, with a transport device having a planar drive, FIG. 2 a schematic illustration of an exemplary progression of the method according to the invention for producing packagings, FIG. 3 a schematic diagram regarding processing steps, for a production of packagings, on a packaging part during a transport by the transport device having a planar drive, and FIG. 4 a schematic illustration of an alternative implementation of a packaging system according to the invention for executing a method according to the invention for producing packagings, with a transport device having a planar drive.

In FIG. 1 a packaging system 10*a* for producing packagings 12*a* and for loading the packagings 12*a* during production is shown in a schematic plan view. The packaging system 10*a* is configured for an execution of a method 100*a* for producing packagings 12*a* (see FIG. 2). The packaging system 10*a* comprises a transport device 14*a* having a planar drive (not shown in detail in the figures), a plurality of packaging stations 16*a*, 18*a*, 20*a*, 22*a* which are in each case arranged on the transport device 14*a*, and a plurality of product feeds 24*a*, which are in each case arranged on the transport device 14*a*. The transport device 14*a* comprises a stator 26*a* which forms an effective surface 28*a*, and a plurality of movable platforms 30*a*, which are movable along the effective surface 28*a* via the stator 26*a*. In particular, the stator 26*a* is embodied as part of the planar drive. The movable platforms 30*a* are implemented such that they are movable in a driven manner via the planar drive along the stator 26*a*, in particular the effective surface 28*a* of the stator 26*a*. The transport device 14*a* is configured to move the platforms 30*a* along the effective surface 28*a* at a distance from the stator 26*a*, in particular from the effective surface 28*a*, in particular at least substantially parallel to the effective surface 28*a* and/or to a main extension plane of the stator 26*a*. The stator 26*a* is configured to subject the platforms 30*a* in each case, via a magnetic field, to a force directed toward the effective surface 28*a*. The effective surface 28*a* delimits a plurality of pass-throughs for a flow-through of air (not shown in the figures), distributed over an entire area of the effective surface 28*a*. The stator 26*a* is configured to hold the platforms 30*a* in each case in a state of being at a distanced from the effective surface 28*a* via the air, in particular via an airgap between the platforms 30*a* and the stator 26*a*. A movement of the individual platforms 30*a* along the effective surface 28*a* is realized by a reluctance force between the stator 26*a*, in particular a region of the stator 26*a* in which the respective platform 30 is to move, and the respective platform 30*a*. Preferably the stator 26*a* is configured to adjust a minimal distance at which the platforms 30*a* move along the stator 26*a* in each case by an adaption of a flow-through of air and/or by an adaption of the magnetic field in a region in which the respective platform 30*a* is arranged on the stator 26*a*, in particular on the effective surface 28*a*, wherein the platforms 30*a* in particular move in each case, in a direction that is oriented transversally to the stator 26*a*, away from the stator 26*a*, in particular from the effective surface 28*a*, or towards the stator 26*a*, in particular towards the effective surface 28*a*. Preferentially the packaging system 10*a* is configured for a production of the packagings 12*a* from packaging parts 32*a*. Preferably the packaging system 10*a* is configured to fill the packagings 12*a*/packaging parts 32*a* with products during a production of the packagings 12*a*. In particular, the packaging system 10*a* is configured to produce respectively one of the packagings 12*a* from one of the packaging parts 32*a*. It is also conceivable that the packagings 12*a* are in each case produced from a plurality of packaging parts. The packaging parts 32*a* are embodied as carton parts, in particular as carton blanks. In particular, the packaging system 10*a* and/or the method 100*a* are/is configured for producing carton packagings. However, other implementations of the packaging parts 32*a* and/or of the packagings 12*a* are also conceivable. The platforms 30*a* of the transport device 14*a* are in each case implemented so as to be plate-shaped. The platforms 30*a* of the transport device 14*a* in each case have a support surface 33*a* for laying the packaging parts 32*a* thereupon.

The packaging system 10*a* comprises two loading units 34*a*, which are configured to transfer respectively one packaging part 32*a* to the transport device 14*a*. The loading units 34*a* are in each case configured for transferring one of two different packaging parts 32*a*, which are in each case configured for a production of one of two different packaging types. The two loading units 34*a* are arranged side by side on the transport device 14*a* and are in each case configured to transfer the respective packaging parts 32*a* to respectively two of the movable platforms 30*a* in one point of the transfer device 14*a*. In particular, in a transfer to the transport device 14*a*, the packaging parts 32*a* are in each case laid upon two of the movable platforms 30*a*, such that the individual packaging parts 32*a* are preferably supported by the two platforms 30*a*. Alternatively, it is conceivable that the packaging parts 32*a* are in each case supported by only one movable platform 30*a* (see FIG. 4) or by more than two movable platforms 30*a*, and/or that the individual packaging parts 32*a* are clamped between the two platforms 30*a* for a transport.

The stator 26*a* of the transport device 14*a* has a closed effective surface 28*a*. Alternatively, it is also conceivable that the transport device 14*a* comprises more than one stator 26*a* and/or that the stator 26*a* comprises several effective surfaces 28*a* implemented separately from one another, wherein in the production by the packaging system 10*a*, in particular the packaging parts 32*a*, respectively the packagings 12*a*, are transferred from an effective surface 28*a* to another effective surface 28*a* by a transfer unit, for example conveyor belts, robot arms, suction cups or the like. It is conceivable that the packaging parts 32*a*, respectively the packagings 12*a*, are transferred with the platform/s 30*a* which transport the respective packaging part 32*a*, respectively the respective packaging 12*a*. The packaging system 10*a* comprises a control unit 36*a*, which is configured to control the movable platforms 30*a* via the stator 26*a*, respectively the planar drive, during a movement along the effective surface 28*a*. The control unit 36*a* is in particular configured to control the movable platforms 30*a* in such a way that packaging parts 32*a*/packagings 12*a* transported via the platforms 30*a* are moved along a designated production path 38*a*, 40*a*, 42*a* along the stator 26*a*, in particular along the effective surface 28*a*.

The packaging system 10*a* implements by the transport device 14*a*, in particular by the platforms 30*a* which are movable on the stator 26*a*, a plurality of production paths 38*a*, 40*a*, 42*a*. Preferentially, for a production of a packaging 12*a* and/or for a filling, the packaging parts 32*a* are respectively moved via the platforms 30*a* along one of the production paths 38*a*, 40*a*, 42*a*. The production paths 38*a*, 40*a*, 42*a* in each case extend over a different number of packaging stations 16*a*, 18*a*, 20*a*, 22*a*, respectively over different ones of the packaging stations 16*a*, 18*a*, 20*a*, 22*a* of the packaging system 10*a*. The packaging system 10*a* comprises a first packaging station 16*a* and a further first packaging station 16*a*', which are in each case configured for folding packaging parts 32*a* when the packaging parts 32*a* are moved past them via the platforms 30*a*. The packaging parts 32*a* in each case have several pre-fold seams 44*a* (see FIG. 3), via which in each case a wall 46*a* and a further wall 48*a* of the packaging parts 32*a* (see FIG. 3) are connected with each other. During a transport via the platforms 30*a*, wherein the packaging parts 32*a* are in particular moved through the first packaging station 16*a* or through the further first packaging station 16*a*', the packaging parts 32*a* are folded at the pre-fold seams 44*a*, wherein in particular the walls 46*a* are moved relative to the further walls 48*a*. The first packaging station 16*a* is configured to process packaging parts 32*a* for a production of a first packaging type. The further first packaging station 16*a*' is configured to process packaging parts 32*a* for a production of a second packaging type. Alternatively, it is conceivable that a single first packaging station 16*a* or two at least substantially identically constructed first packaging stations 16*a* is/are configured for a folding of the packaging parts 32*a*, wherein for example, depending on the respective packaging type, a movement of the packaging parts 32*a*, when moving through the first packaging station 16*a* via the transport device 14*a*, in particular the stator 26*a*, in each case follows a different movement path, in particular such that the different packaging types get folded in different ways. The production paths 38*a*, 40*a*, 42*a* of the packaging system 10*a* in each case run through the first packaging station 16*a* or the further first packaging station 16*a*'. The first packaging station 16*a* and the further first packaging station 16*a*' respectively comprise a plurality of tools 50*a*, which are embodied as slotted-link elements (see also FIG. 3). The tools 50*a* of the first packaging station 16*a* and the further first packaging station 16*a*' are in each case implemented at least substantially immobile. In particular, for an interaction with one of the tools 50*a* of the first packaging station 16*a* and the further first packaging station 16*a*', the packaging parts 32*a* are configured to be brought into contact with the respective tool 50*a* via the platforms 30*a*, wherein in particular the packaging parts 32*a* are in each case folded/processed. The tools 50*a* of the first packaging station 16*a* and the further first packaging station 16*a*' are in each case configured, in a movement of the packaging parts 32*a* via the platforms 30*a*, to interact with a wall 46*a*, 48*a* of the packaging parts 32*a*, wherein in particular the respective wall 46*a*, 48*a* is moved relative to one or several other wall/s 46*a*, 48*a* of the packaging part 32*a*, wherein in particular the packaging part 32*a* is folded. The first packaging station 16*a* and the further first packaging station 16*a*' are in each case configured to fold the packaging parts 32*a* in such a way that a respective packaging volume 52*a* (see FIG. 3) is delimited by walls 46*a*, 48*a* of the individual packaging parts 32*a*. In particular, the packaging parts 32*a*/packagings 12*a* are configured to respectively receive products via the packaging volume 52*a*.

Downstream of the first packaging station 16*a*, respectively the further first packaging station 16*a*', in particular viewed along the production paths 38*a*, 40*a*, 42*a*, the product feeds 24*a* of the packaging system 10*a* are arranged. Preferentially the product feeds 24*a* form a filling station 54*a* of the packaging system 10*a*. In particular, the platforms 30*a* are configured, during a transport after leaving the first packaging station 16*a* or the further first packaging station 16*a*', to move the packaging parts 32*a* through one of the product feeds 24*a*. The packaging system 10*a* comprises three product feeds 24*a*, which are in particular arranged side by side at the transport device 14*a*. The product feeds 24*a* are in each case configured for filling a product into the processed packaging parts 32*a*, in particular while the packaging parts 32*a* are moved past or below them. The product feeds 24*a* are in each case configured to output a same product type. Alternatively, it is conceivable that different product feeds 24*a* are configured for filling the packaging parts 32*a* each with a different product type. Alternatively or additionally, it is conceivable that the packaging system 10*a* comprises only one product feed 24*a* (see FIG. 4) or two product feeds 24*a* or more than three product feeds 24*a*. In particular, the product feeds 24*a* are configured in each case to put a respective predetermined quantity of products into the individual packaging parts 32*a*. In particular, the platforms 30*a* are configured, preferably by way of an actuation by the control unit 36*a*, to actuate a respective product feed 24*a* of the plurality of product feeds 24*a* of the transport device 14*a*, depending on an availability of products at the respective product feed 24*a*. Preferably, for a filling of the packaging part 32*a* transported on a respective production path 38*a*, 40*a*, 42*a* with products, the production paths 38*a*, 40*a*, 42*a* in each case run past at least one product feed 24*a*.

Downstream of the filling station 54*a* and/or of the product feeds 24*a*, in particular viewed along at least one of the production paths 38*a*, 40*a*, 42*a*, a second packaging station 18*a* is arranged. The second packaging station 18*a* comprises a tool 56*a*, which is realized as an exit opening and is implemented for outputting an adhesive material. Preferentially the second packaging station 18*a*, in particular the tool 56*a* of the second packaging station 18*a*, is configured, in a movement of the packaging parts 32*a* through the second packaging station 18*a* via the platforms 30*a*, to apply the adhesive material onto designated points of the packaging part 32*a*. The tool 56*a* of the second packaging station 18*a* is implemented at least substantially immobile, wherein in particular the packaging parts 32*a* are moved via the platforms 30*a* to the tool 56*a* with the points of the packaging parts 32*a* which are to be provided with the adhesive material, wherein in particular the packaging parts 32*a* respectively interact with the tool 56*a* of the second packaging station 18*a*. Alternatively it is conceivable that, instead of or in addition to gluing, packagings 12*a* are for example stuck together, riveted and/or clamped by means of the packaging system 10*a*.

The packaging system 10*a* comprises a third packaging station 20*a*, which is in particular configured for an inspection of processed and/or filled packaging parts 32*a*. The third packaging station 20*a* comprises a camera 58*a* for a registration of packaging parts 32*a* which are moved through the third packaging station 20*a* via movable platforms 30*a*. However, different implementations of the third packaging station 20*a* are also conceivable, for example with a scanner for a registration of an identifier marking on the packaging parts 32*a*, with a distance meter for a registration of outer dimensions of the individual packaging parts 32*a*, or the like. For example, the third packaging station 20*a* is configured for registering, in particular by means of the camera, a shape of the respective packaging part 32*a*, a filling level of the respective packaging part 32*a*, a quantity of the adhesive material and/or an area of the respective packaging part 32*a* that is covered in the adhesive material, or the like. In particular, only part of the production paths 38*a*, 40*a*, 42*a* of the packaging system 10*a* runs through the third packaging station 20*a*. It is conceivable that the transport device 14*a* is configured and/or actuated such that packaging parts 32*a* are moved via the platforms 30*a* from the first packaging station 16*a* or the further first packaging station 16*a*', from the filling station 54*a* and/or from one of the product feeds 24*a* and/or from the second packaging station 18*a* to the third packaging station 20*a*, in particular directly. It is conceivable that a packaging part 32*a* is moved to the third packaging station 20*a* only at regular intervals, for example at predetermined time intervals and/or following a given number of processed packaging parts 32*a*. For example, it is conceivable that a packaging part 32*a* passes through the third packaging station 20*a* directly after a processing by the first packaging station 16*a* or the further first packaging station 16*a*'. Alternatively or additionally, it is conceivable that a packaging part 32*a* passes through the third packaging station 20*a* directly after a processing by the second packaging station 18*a*. Preferably the transport device 14*a* is configured to transport the packaging parts 32*a* via the platforms 30*a*, after passing through the third packaging station 20*a*, to one of the product feeds 24*a*, to the third packaging station 20*a* or to one of two fourth packaging stations 22*a* of the packaging system 10*a*, in particular depending on which stations of the packaging system 10*a* the respective packaging part 32*a* has already passed through before the third packaging station 20*a*.

The two fourth packaging stations 22*a* are arranged downstream of the second packaging station 18*a* and/or of the third packaging station 20*a*, in particular viewed along the respective production path 38*a*, 40*a*, 42*a*. The two fourth packaging stations 22*a* are realized so as to be substantially identical with regard to their construction. Alternatively, it is conceivable that the two fourth packaging stations 22*a* are in each case configured for a processing of one of the two different packaging types. The two fourth packaging stations 22*a* are in each case configured to close packaging parts 32*a* which move past via the platforms 30*a* by means of a tool 60*a* that is embodied as a slotted link, wherein in particular the packaging volume 52*a* is closed and/or at least a region of the respective packaging part 32*a* is pressed onto a point of the respective packaging part 32*a* that is covered in the adhesive material. The tools 60*a* of the two fourth packaging stations 22*a* are in each case implemented at least substantially immobile. Preferentially the two fourth packaging stations 22*a*, in particular the tools 60*a* of the two fourth packaging stations 22*a*, are in each case configured for processing the packaging parts 32*a* independently from the respective packaging type. The transport device 14*a* is configured for moving the platforms 30*a*, in a movement through one of the two fourth packaging stations 22*a*, depending on a packaging type assigned to the respective packaging part 32*a*, at different minimal distances from the stator 26, in particular the effective surface 28*a* of the stator 26*a*. In particular, the platforms 30*a* are implemented so as to be movable by the stator 26*a* transversally to the stator 26*a*, in particular the effective surface 28*a*. Preferably, for a closing of the packaging part 32*a*, the platforms 30*a* are configured, when passing through one of the fourth packaging stations 22*a*, respectively when moving past the tool 60*a* of one of the fourth packaging stations 22*a*, to be moved transversally to the effective surface 28*a* into a predetermined height relative to the tool 60*a*, depending on the packaging type of the packaging part 32*a* transported via the respective platforms 30*a*. It is conceivable that the packaging parts 32*a* move along the stator 26*a* via the platforms 30*a* in subregions of one of the production paths 38*a*, 40*a*, 42*a* with a different speed than in the remaining portion of the respective production path 38*a*, 40*a*, 42*a*. For example, the packaging parts 32*a* move via the platforms 30*a*, in a region of the two fourth packaging stations 22*a*, with a smaller speed than in a region before the two fourth packaging stations 22*a*, in particular in order to ensure a sufficiently long drying period for the adhesive material. Alternatively, it is conceivable that the platforms 30*a* with the packaging parts 32*a* move in subregions of the stator 26*a* faster or that they move over the entire stator 26*a* at a speed that remains substantially constant. In particular, the transport device 14*a* is configured to distribute the packaging parts 32*a* to the two fourth packaging stations 22*a* via the movable platforms 30*a*, wherein in particular a throughput of packaging parts 32*a* to be processed through the two fourth packaging stations 22*a* is substantially the same.

The packaging system 10*a* comprises two removal units 62*a*, which are configured for removing the completed, in particular processed and filled, packagings 12*a* from the transport device 14*a*, in particular from the platforms 30*a*. For example, the removal units 62*a* respectively comprise at least one gripper or sucker or clamp or a different gripping and/or removal element. Alternatively, it is conceivable that the removal units 62*a* are in each case embodied as a conveyor belt, wherein in particular the platforms 30*a* are configured, for example by a movement relative to each other, to push and/or drop the packagings 12*a* on one of the removal units 62*a* respectively. It is conceivable that the removal units 62*a* remove the packagings 12*a* and the respectively two platforms 30*a* transporting the individual packagings 12*a* together or separately from one another, the removed platforms 30*a* being preferably configured to be re-arranged on the stator 26*a* via one of the loading units 34*a* together with packaging parts 32*a*. Alternatively it is conceivable that, following the removal of the packagings 12*a*, the non-loaded platforms 30*a* are moved back to the loading units 34*a* via the stator 26*a*. It is conceivable that the stator 26*a* forms a re-conveying path (not shown in FIG. 1), which is configured to convey the non-loaded platforms 30*a* back to the loading units 34*a* separately from the platforms 30*a* loaded with packaging parts 32*a*.

The production paths 38*a*, 40*a*, 42*a* of the transport device 14*a* and/or the movement paths of the movable platforms 30*a* for a transport of the packaging parts 32*a* are preferably individually adjustable, in particular for the different packaging types, by means of the control unit 36*a*. Preferentially the individual movable platforms 30*a* of the transport device 14*a* are individually controllable by means of the control unit 36*a*. In particular, the control unit 36*a* is configured, in each case depending on a packaging type of the packaging part 32*a* transported via the respective platform 30*a*, to control the movable platforms 30*a* automatically and/or via a process parameter given by a user.

It is conceivable that one or several packaging station/s 16*a*, 18*a*, 20*a*, 22*a* of the packaging system 10*a* comprises/comprise movable tools for a processing of the packaging parts 32*a*, for example as a robot arm or as a pivoting arm, or on a robot arm or on a pivoting arm, or the like. It is conceivable that the platforms 30*a* comprise holding elements for fixing a packaging part 32*a* that is to be transported, for example at least one gripper or sucker, or via a negative pressure at the support surface 33*a*, or the like. In addition, implementations of the transport device 14*a* are conceivable in which the packaging parts 32*a* are transported while suspended from the platforms 30*a*. Generally, further implementations of the packaging system 10*a* are also conceivable, for example implementations having a different number and/or sequence and/or different embodiments of packaging stations 16*a*, 18*a*, 20*a*, 22*a*, product feeds 24*a* and/or production paths 38*a*, 40*a*, 42*a* (see for example FIG. 4) and/or additional packaging stations. The packaging system 10*a* described in FIGS. 1 to 3, in particular the transport device 14*a* as well, shall not be limited to the number of packaging stations 16*a*, 18*a*, 20*a*, 22*a*, product feeds 24*a* and/or production paths 38*a*, 40*a*, 42*a* described here.

Figure 2:
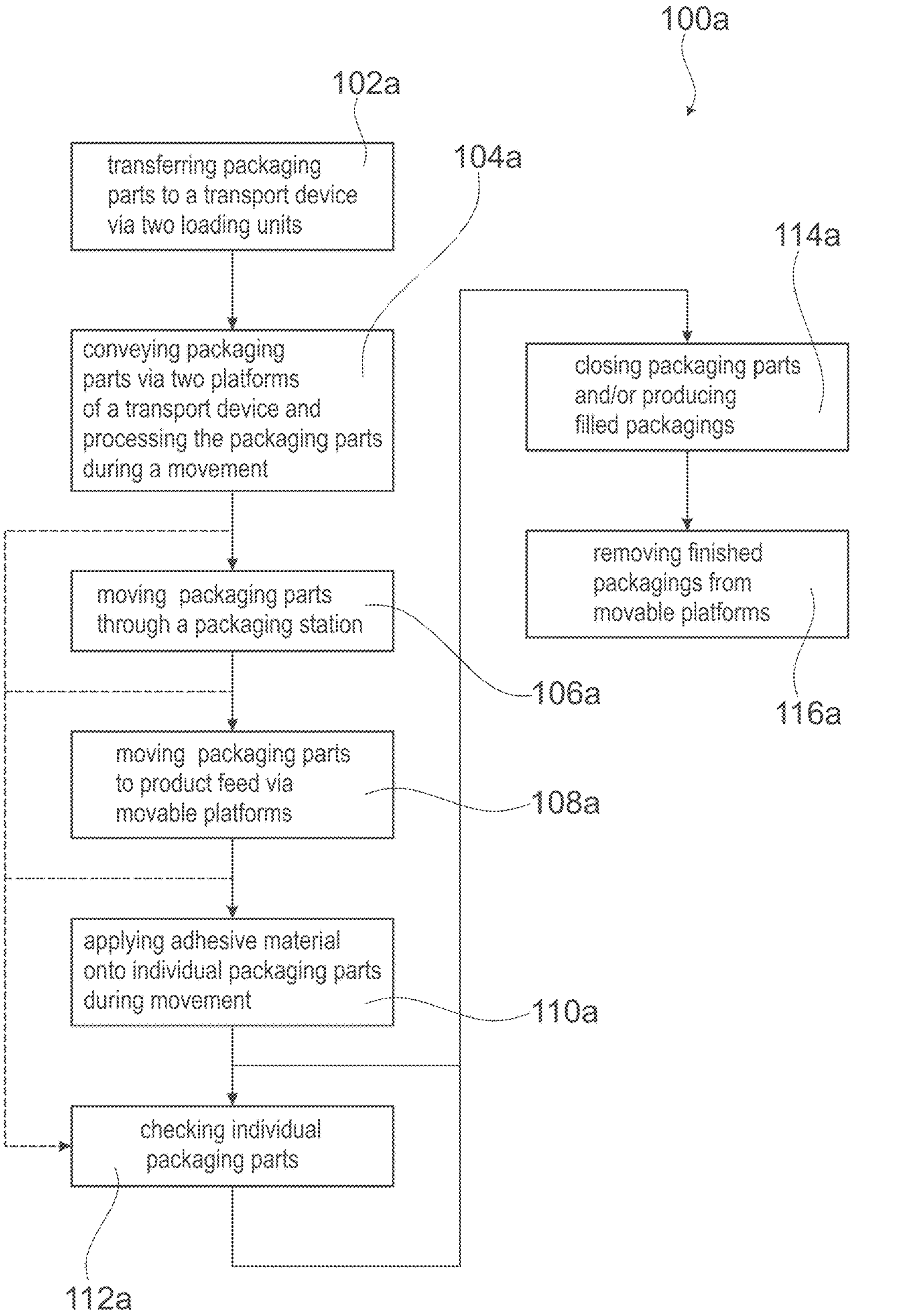

In FIG. 2 an exemplary progression of the method 100*a* for producing packagings 12*a* by means of the packaging system 10*a* is illustrated schematically. The packaging parts 32*a* are transported by means of the transport device 14*a* along one of several different possible predetermined production paths 38*a*, 40*a*, 42*a*. Two different packaging types are produced at least substantially simultaneously by means of the packaging system 10*a*, respectively the transport device 14*a*.

In a method step 102*a* of the method 100*a*, the packaging parts 32*a* are transferred to the transport device 14*a* via the two loading units 34*a*, and are in particular in each case laid upon two of the movable platforms 30*a*, in particular upon the support surfaces 33*a* of the movable platforms 30*a*. For producing one of the packaging types, the movable platforms 30*a* of the transport device 14*a* are in each case moved, depending on a type of the packaging part 32*a* transported via the respective platform 30*a*, on a predetermined production path 38*a*, 40*a*, 42*a* assigned to the respective packaging type (see FIG. 1).

In a further method step 104*a* of the method 100*a*, the packaging parts 32*a* are conveyed by means of the transport device 14*a* having a planar drive, wherein the packaging parts 32*a* are in each case moved via two of the platforms 30*a* of the transport device 14*a* which are movable by means of the planar drive, and are processed during a movement induced by the platform 30*a*. The processing steps, carried out via the packaging stations 16*a*, 18*a*, 20*a*, 22*a* for a production of the packagings 12*a* from the packaging parts 32*a*, are in each case realized at least partly by a force induced by the movable platforms 30*a*. During a transport via the movable platforms 30*a*, for executing several processing steps for a production of a packaging, the packaging parts 32*a* successively pass through at least part of the packaging stations 16*a*, 18*a*, 20*a*, 22*a* of the packaging system 10*a*.

In a further method step 106*a* of the method 100*a*, the packaging parts 32*a* are moved through one of the first packaging stations 16*a*, 16*a*', in particular the first packaging station 16*a* or the further first packaging station 16*a*', in particular depending on a packaging type that is to be produced from the respective packaging part 32*a*. For producing the packagings 12*a*, in a method step of the method 100*a*, in particular the method step 106*a*, the packaging parts 32*a*, transported in each case via two movable platforms 30*a*, are in each case folded during a movement by means of the tools 50*a* of one of the first packaging stations 16*a*, 16*a*'. In particular, in a folding of the packaging parts 32*a*, in each case the packaging volume 52*a* is formed from walls 46*a*, 48*a* of the individual packaging parts 32*a*. In a method step of the method 100*a*, in particular the method step 106*a*, a processing step is executed for producing the packagings 12*a* from the packaging parts 32*a*, in particular for folding, by a direct interaction of the packaging parts 32*a*, which in each case move via two movable platforms 30*a*, with the tools 50*a* of one of the first packaging stations 16*a*, 16*a*', which are implemented at least substantially immobile relative to the movable platform 30*a*. Preferably the packaging parts 32*a*, implemented as carton blanks, are erected by one of the first packaging stations 16*a*, 16*a'*.

In a further method step 108*a* of the method 100*a*, the packaging parts 32*a* are moved to one of the product feeds 24*a* via the movable platforms 30*a*. In a method step of the method 100*a*, in particular the method step 108*a*, products are put into the processed, in particular folded, packaging parts 32*a*, in particular into the packaging volumes 52*a*, during a transport by the transport device 14*a*, wherein the movable platform 30*a* actuates a product feed 24*a* of the plurality of product feeds 24*a* of the transport device 14*a*, depending on an availability of products at the respective product feed 14*a*.

In a further method step 110*a* of the method 100*a*, during a movement of the packaging parts 32*a* which are in each case transported via two of the movable platforms 30*a*, the adhesive material is applied onto the individual packaging parts 32*a* by the tool 54*a* of the second packaging station 18*a* for a production of the packagings 12*a*. In a method step of the method 100*a*, in particular the method step 110*a*, a processing step, in particular the application of the adhesive material, for producing the packagings 12*a* from the packaging parts 32*a* is brought about by two movable platforms 30*a* moving relative to each other. In a method step of the method 100*a*, in particular the method step 110*a*, the packaging parts 32*a*, transported in each case via two movable platforms 30*a*, are rotated around at least one axis by a relative movement of the movable platforms 30*a* for a production of the packagings 12*a*, in particular for an application of the adhesive material.

In a further method step 112*a* of the method 100*a*, individual packaging parts 32*a* are moved through the third packaging station 20*a*, wherein in particular those points of the packaging parts 32*a* are checked which were provided with the adhesive material. Alternatively or additionally, it is conceivable that individual packaging parts 32*a* are moved through the third packaging station 20*a* after folding, after filling and/or after closing, in particular for the purpose of checking a shape of the processed packaging part 32*a*, a filling quantity and/or a gluing point of the processed and/or filled packaging part 32*a* and/or of a closure region of the produced packaging 12*a*. In a method step of the method 100*a*, in particular the method step 112*a*, for checking a previously executed processing step, at regular intervals a portion of the transported packaging parts 32*a* is deflected onto a different production path 40*a*, 42*a*, which in particular comprises the third packaging station 20*a*. It is thus conceivable that the method step 112*a* is carried out at a different stage of the method 100*a*, for example following one of the method steps 102*a*, 104*a*, 106*a*, 108*a*. Preferably, at the third packaging station 20*a*, the packaging parts 32*a* are rotated around at least one axis by a relative movement of the two movable platforms 30*a* transporting the respective packaging part 32*a* for the purpose of checking, in particular via the camera 58*a*, in particular for a complete registration of the packaging part 32*a* that is to be checked. It is conceivable that for an evaluation, the data captured via the camera 58*a* for checking the packaging parts 32*a* are processed by means of a computing unit and/or control unit of the third packaging station 20*a* and/or by means of the control unit 36*a*. If deficiencies are detected in the checking process, it is conceivable that the respective packaging part 32*a* is removed from the transport device 14*a* and/or further packaging parts 32*a* are checked.

In a further method step 114*a* of the method 100*a*, the packaging parts 32*a* are moved via the movable platforms 30*a* through one of the two fourth packaging stations 22*a* for closing and/or producing the filled packagings 12*a*. Preferentially the packaging parts 32*a* are closed by means of the tool 60*a* of one of the fourth packaging stations 22*a*. In particular, the packaging parts 32*a* directly interact with one of the tools 60*a* of one of the fourth packaging stations 22*a* for closing, wherein during a movement via the movable platforms 30*a* relative to the respective tool 60*a*, the packaging parts 32*a* are subjected to a force by means of the respective tool 60*a* by moving and approaching via the platforms 30*a*. In a method step of the method 100*a*, in particular the method step 114*a*, for a transport of the packaging parts 32*a* and for closing the packaging parts 32, the movable platforms 30*a* are in each case moved in a direction that is oriented transversally to the stator 26*a* of the transport device 14*a* for a processing step, in particular for closing, in particular depending on the respective packaging type, wherein the packaging part 32*a* transported via the respective platform 30*a* is at least partly deformed in the processing step. Preferentially the packaging parts 32*a* are lifted or lowered via the platforms 30*a* to a predetermined height relative to the tool 60*a*, such that the tool 60*a* is appropriate for a closing of the respective packaging type.

In a further method step 116*a* of the method 100*a*, the finished, in particular closed and filled, packagings 12*a* are removed, for example lifted, slid or pushed, from the movable platforms 30*a* by means of the removal units 62*a*.

In FIG. 2 an exemplary implementation of the method 100*a* is described. The sequence of the method steps 102*a*, 104*a*, 106*a*, 108*a*, 110*a*, 112*a*, 114*a*, 116*a* of the method 100*a* applies for individual packaging parts 32*a* for a production of the packagings 12*a*, wherein in particular the method steps 102*a*, 104*a*, 106*a*, 108*a*, 110*a*, 112*a*, 114*a*, 116*a* are gone through in such a sequence substantially simultaneously by a plurality of packaging parts 32*a* during the method 100*a*. Other implementations of the method 100*a* are also conceivable, for example with a different sequence of the method steps 102*a*, 104*a*, 106*a*, 108*a*, 110*a*, 112*a*, 114*a*, 116*a* and/or with a different number of method steps. In addition, it is conceivable that in the method 100*a* the packaging parts 32*a* are printed and/or something is pasted on the packaging parts 32*a*, for example at one of the packaging stations 16*a*, 16*a*', 18*a*, 20*a*, 22*a* of the packaging system 10*a* or at a different further packaging station. It is conceivable that a pasting and/or a printing of the packaging parts 32*a* will be checked in at least one method step of the method, for example the method step 112*a*. For example, it is conceivable that a logo, a sell-by date, or something like that is printed or pasted onto the packaging parts 32*a*. In addition, it is conceivable that only part of the transported packaging parts 32*a* is printed/pasted, for example only every fourth packaging part 32*a*. Alternatively or additionally, it is conceivable that the packaging parts 32*a* and/or the packagings 12*a* are weighed during the transport, for example by the third packaging station 20*a* or by a different further packaging station of the packaging system 10*a*. It is in particular conceivable that for a weighing the packaging parts 32*a*/packagings 12*a* are shortly removed from the platforms 30*a* or that they are weighed together with the platforms 30*a*.

Figure 3:
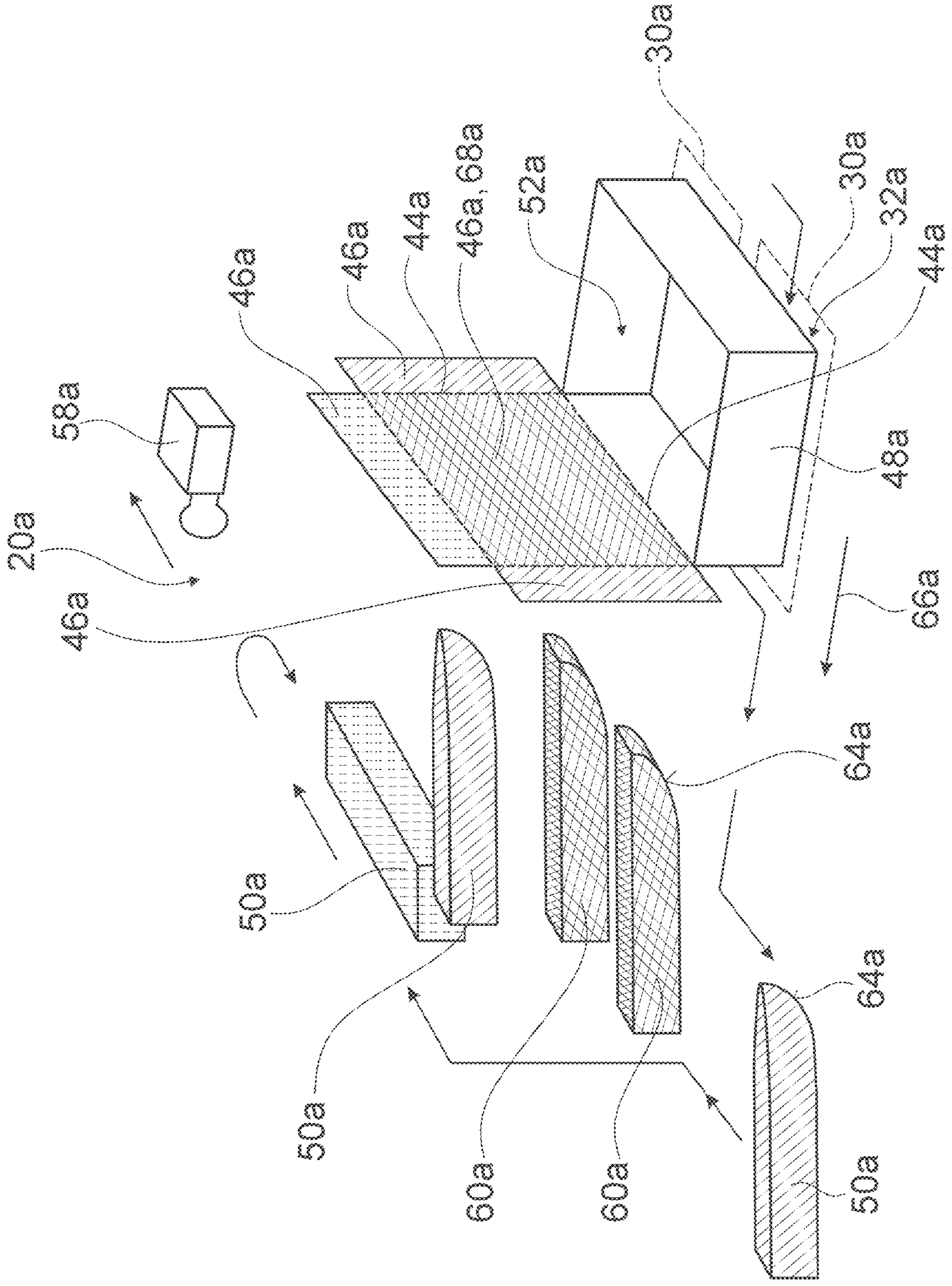

In FIG. 3, by way of example, several processing steps for folding, closing and inspecting a packaging 12*a*, respectively a packaging part 32*a*, are shown schematically together with the tools 50*a*, 56*a*, 60*a* which are provided therefor. In particular, in FIG. 3 the processing steps are not shown in the afore-described sequence predetermined by the transport device 14*a* but as a schematic diagram with a packaging part 32*a*. The tools 50*a*, 60*a*, which are embodied as slotted links, in each case have an at least partially round form-fitting surface 64*a* for an even movement of a wall 46*a* of a packaging part 32*a* which is to be folded, to be deformed and/or to be closed. The packaging parts 32*a* are moved to the respective tool 50*a*, 56*a*, 60*a* via the platforms 30*a* along a predetermined processing direction 66*a*. The wall to be processed 46*a* of the individual packaging parts 32*a* is in each case moved to the form-fitting surface/s 64*a* of the respective tool 50*a*, 60*a* via the platforms 30*a*. The form-fitting surfaces 64*a* of the tools 50*a*, 60*a* embodied as slotted links are in each case configured to interact with the respective wall to be processed 46*a* of the packaging parts 32*a*, wherein in particular the wall 46*a* is moved, in particular bent/folded, relative to the remaining portion of the packaging part 32*a*. In particular, in an interaction with one of the tools 50*a*, 60*a* that are embodied as slotted links, the walls to be processed 46*a* of the packaging parts 32*a* are moved around a pre-fold seam 44*a*, which preferably extends substantially in a straight line. In a closing of the packaging parts 32*a*, in each case, by an interaction with at least one tool 50*a*, 60*a* embodied as a slotted link, at least one cover wall 68*a* of the packaging parts 32*a* is folded in such a way that the packaging volume 52*a* of the respective packaging part 32*a* is realized so as to be completely enclosed by the walls 46*a*, 48*a* of the packaging part 32*a*, which in particular comprise the at least one cover wall 68*a*. In particular, the filled-in products are arranged within the packaging volume 52*a* and are at least substantially completely enclosed by the walls 46*a*, 48*a* of the packaging part 32*a*.

Figure 4:
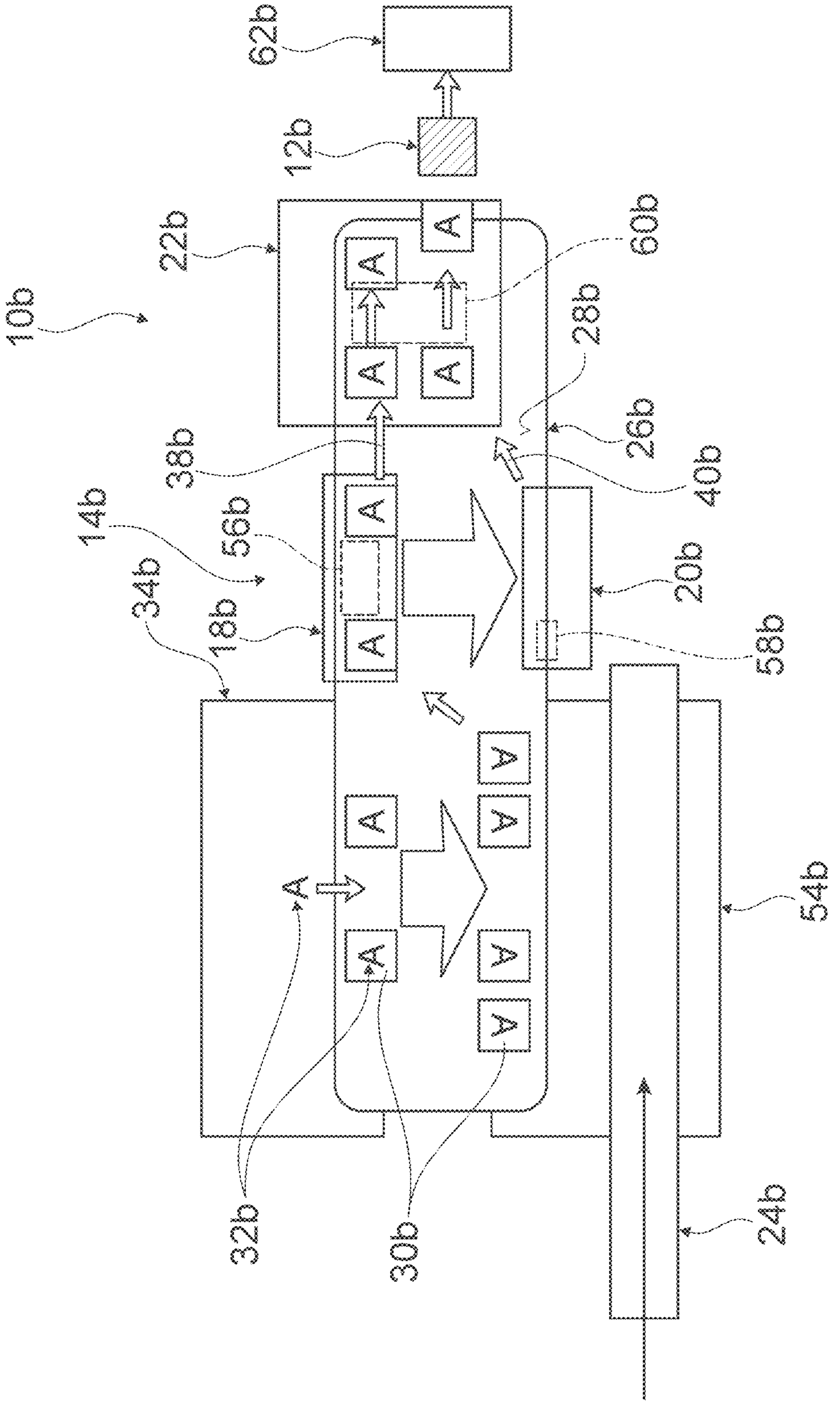

In FIG. 4 a further exemplary embodiment of the invention is shown. The following description and the drawing are substantially limited to the differences between the exemplary embodiments wherein principally, regarding components having the same denomination, in particular regarding components having the same reference numerals, the drawings and/or the description of the respective other exemplary embodiment, in particular of FIGS. 1 to 3, may be referred to. For distinguishing between the exemplary embodiments, the letter a has been added to the reference numerals of the exemplary embodiment in FIGS. 1 to 3. In the exemplary embodiment of FIG. 4 the letter a has been substituted by the letter b.

In FIG. 4 an alternative implementation of a packaging system 10*b* for producing packagings 12*b* is illustrated. The packaging system 10*b* is configured for executing a method 100*b* for producing packagings 12*b*, which is preferentially realized essentially analogously to the method 100*a* described in FIG. 2, wherein preferably in a method step of the method 100*b* packaging parts 32*b*, in particular realized as carton parts/carton blanks, are conveyed via a transport device 14*b* having a planar drive of the packaging system 10*b*, wherein the packaging parts 32*b* are in each case moved via at least one platform 30*b* of the transport device 14*b*, which is movable by means of the planar drive, and are processed during a movement induced by the platform 30*b*, wherein at least one processing step for producing a packaging 12*b* from a packaging part 32*b* is brought about at least partly by a force induced by the at least one movable platform 30*b*. The packaging system 10*b* comprises the transport device 14*b* having a planar drive, a plurality of packaging stations 18*b*, 20*b*, 22*b*, in each case arranged at the transport device 14*b*, and a product feed 24*b* arranged at the transport device 14*b*. The packaging system 10*b* shown in FIG. 4 is implemented at least substantially identically to the packaging system 10*a* illustrated in FIGS. 1 to 3. Therefore, the description of FIGS. 1 to 3 is generally referred to for a description of similar components of the packaging system 10*b*. Differently than in the packaging system 10*a* shown in FIGS. 1 to 3, the packaging system 10*b* shown in FIG. 4 comprises only one product feed 24*b*, only one loading unit 34*b*, only one removal unit 62*b* and preferably a different number of packaging stations 18*b*, 20*b*, 22*b*. The loading unit 34*b* is configured to transfer to the transport device 14*b* packaging parts 32*b* which are already pre-formed and glued or premounted in a different fashion. The transport device 14*b* is configured for moving the individual packaging parts 32*b* in each case via a movable platform 30*b* along a stator 26*b* of the transport device 14*b*, in particular along an effective surface 28*b* of the stator 26*b*. The transport device 14*b*, in particular the individual platforms 30*b*, is/are configured—in particular after a transfer by the loading unit 34*b*— to rotate the packaging parts 32*b* around an axis that is vertical, in particular relative to the effective surface 28*b*, and to move them to the product feed 24*b*. The product feed 24*b* is configured for filling the packaging parts 32*b* with products. It is conceivable that the product feed 24*b* is configured for filling several packaging parts 32*b* with products in succession or substantially simultaneously. The transport device 14*b* is configured to move the packaging parts 32*b* via the movable platforms 30*b* downstream of the product feed 24*b* to a first packaging station 18*b*. The first packaging station 18*b* is in particular substantially identical to the second packaging station 18*a* of the packaging system 10*a* described in FIGS. 1 to 3. The first packaging station 18*b* comprises a tool 56*b*, which is embodied as an exit opening and is implemented for outputting an adhesive material. Preferentially, the first packaging station 18*b*, in particular the tool 56*b* of the first packaging station 18*b*, is configured, in a movement of the packaging parts 32*b* via the platforms 30*b* through the first packaging station 18*b*, to apply the adhesive material onto designated points of the packaging parts 32*b*. The tool 56*b* of the first packaging station 18*b* is implemented at least substantially immobile relative to the platforms 30*b*, wherein in particular the packaging parts 32*b* are moved via the platforms 30*b* to the tool 56*b* with those points of the packaging parts 32*b* that are to be provided with the adhesive material, wherein in particular the packaging parts 32*b* respectively interact with the tool 56*b* of the first packaging station 18*b*. Alternatively it is conceivable that, instead of or in addition to a gluing, packagings 12*b* are for example stuck together, riveted and/or clamped via the packaging system 10*b*. Preferentially, when passing through the first packaging station 18*b*, the individual packaging parts 32*b* are rotated around an axis that is oriented at least substantially perpendicularly to the effective surface 28*b* via a respective one of the movable platforms 30*b*. It is also conceivable that the movable platforms 30*b* are in each case configured for moving the individual packaging parts 32*b*, when passing through the first packaging station 18*b*, in a direction that is oriented transversally to the stator 26*b*, in particular to the effective surface 28*b*. For example, the movable platforms 30*b* are in each case configured for moving the individual packaging parts 32*b*, when moving past the tool 56*b* of the first packaging station 18*b*, temporarily away from the stator 26*b* in a direction oriented transversally to the stator 26*b*, in particular to the effective surface 28*b*, so as to enable the tool 56*b* to apply the adhesive material onto a point of the packaging part 32*b*. The transport device 14*b* is configured to move packaging parts 32*b* at regular intervals downstream of the first packaging station 18*b* to a second packaging station 20*b*. The second packaging station 20*b* is configured for checking the, in particular processed and/or filled, packaging parts 32*b*. In particular, the second packaging station 20*b* is implemented substantially identically to the third packaging station 20*a* of the packaging system 10*a* described in FIGS. 1 to 3. Preferably the transport device 14*b* is configured, after a predetermined number in a sequence of processed packaging parts 32*b* and/or respectively after a predetermined time interval, to move a packaging part 32*b* to the second packaging station 20*b*, for example every 10th packaging part 32*b* and/or one packaging part 32*b* per minute. The second packaging station 20*b* comprises a camera 58*b* for a registration of the packaging parts 32*b* transported on the movable platforms 30*b*. The transport device 14*b* is preferably configured to rotate the packaging parts 32*b* via the respective movable platform 30*b* around an axis at the second packaging station 20*b*, in particular in a registering range of the camera 58*b*. This in particular allows complete registration of the respective packaging part 32*b* for the purpose of checking the packaging part 32*b*, for example a shape, a filling level and/or gluing points of the packaging part 32*b*. The transport device 14*b* is configured to move the packaging parts 32*b* via the movable platforms 30*b* on different production paths 38*b*, 40*b*, wherein in particular one production path 38*b* extends through the first packaging station 18*b* and the second packaging station 20*b* is omitted, and preferentially a further production path 40*b* extends through the first packaging station 18*b* and the second packaging station 20*b* in succession.

The transport device 14*b* is configured, depending on a production path 38*b*, 40*b* on which the respective packaging part 32*b* is transported, to move the packaging parts 32*b* downstream of the first packaging station 18*b*, respectively of the second packaging station 20*b*, to a third packaging station 22*b*. The third packaging station 22*b* is configured for closing packaging parts 32*b*, which move past the third packaging station 22*b* via the platforms 30*b*, by means of a tool 60*b* that is implemented as a slotted link, wherein in particular a packaging volume 52*b* is closed and/or at least one region of the respective packaging part 32*b* is pressed onto a point of the respective packaging part 32*b* that is covered in the adhesive material. The tool 60*b* of the third packaging station 22*b* is implemented at least substantially immobile. The third packaging station 22*b*, in particular the tool 60*b* of the third packaging station 22*b*, is configured for processing the packaging parts 32*b* independently from a course of their production path 38*b*, 40*b*. It is conceivable that the transport device 14*b* is configured to move the packaging parts 32*b* along the stator 26*b* via the platforms 30*b* at different speeds in different subregions of a production path 38*b*, 40*b*. For example, it is conceivable that the transport device 14*b* is configured to move the packaging parts 32*b* for a registration by the camera 58*b* in the second packaging station 20*b* at a lower speed than, for example, in a region between the product feed 24*b* and the first packaging station 18*b*, or in particular to shortly stop the packaging parts 32*b* completely. Alternatively or additionally, it is conceivable that the transport device 14*b* is configured to move the packaging parts 32*b* through the third packaging station 22*b* during or after closing, for the purpose of allowing the adhesive material to dry, at a lower speed than, for example, in a region between the first packaging station 18*b*, respectively the second packaging station 20*b*, and the third packaging station 22*b*. The transport device 14*b* is configured to move the finished, in particular closed and filled, packagings 12*b* via the movable platforms 30*b* downstream of the third packaging station 22*b* to the removal unit 62*b*.

The invention claimed is:

1. A method (100*a*; 100*b*) for producing packagings (12*a*; 12*b*), wherein in at least one method step packaging parts (32*a*; 32*b*) are conveyed by a transport device (14*a*; 14*b*) having a planar drive, wherein the packaging parts (32*a*; 32*b*) are in each case moved via at least one platform (30*a*; 30*b*) of the transport device (14*a*; 14*b*) which is movable by the planar drive, and are processed during a movement that is induced by the platform (30*a*; 30*b*), wherein at least one processing step for producing a packaging (12*a*; 12*b*) from a packaging part (32*a*; 32*b*) is realized at least partly by a force generated by the at least one movable platform (30*a*; 30*b*), wherein in at least one method step, for a transport of a packaging part (32*a*; 32*b*), for a processing step for producing a packaging (12*a*; 12*b*), at least one movable platform (30*a*; 30*b*) is moved in a direction that is oriented transversely to a stator (26*a*; 26*b*) of the transport device (14*a*; 14*b*), wherein the packaging part (32*a*; 32*b*) is at least partly deformed in the processing step.

2. The method according to claim 1, wherein for an execution of processing steps for producing a packaging (12*a*; 12*b*), in at least one method step a packaging part (32*a*; 32*b*) passes through a plurality of packaging stations (16*a*, 18*a*, 20*a*, 22*a*; 18*b*; 20*b*; 22*b*) in succession during a transport via a movable platform (30*a*; 30*b*).

3. The method according to claim 1, wherein for producing a packaging (12*a*; 12*b*) from a packaging part (32*a*; 32*b*), in at least one method step at least one processing step is executed by at least two movable platforms (30*a*; 30*b*) moving relative to each other.

4. The method according to claim 1, wherein in at least one method step at least one processing step for producing a packaging (12*a*; 12*b*) from a packaging part (32*a*; 32*b*) is executed by a direct interaction of the packaging part (32*a*; 32*b*) moving via a movable platform (30*a*; 30*b*) with a tool ((50*a*, 56*a*, 60*a*; 56*b*, 60*b*) that is implemented at least substantially immobile relative to the movable platform (30*a*; 30*b*).

5. The method according to claim 1, wherein for producing a packaging (12*a*; 12*b*), in at least one method step an adhesive material is applied onto a packaging part (32*a*; 32*b*) by a tool (56*a*; 56*b*) during a movement of the packaging part (32*a*; 32*b*) that is transported via a movable platform (30*a*; 30*b*) or several movable platforms (30*a*; 30*b*).

6. The method according to claim 1, wherein for producing a packaging (12*a*; 12*b*), in at least one method step a packaging part (32*a*; 32*b*) that is transported via a movable platform (30*a*; 30*b*) or several movable platforms (30*a*; 30*b*) is folded during a movement.

7. The method according to claim 1, wherein for producing a packaging (12*a*; 12*b*), in at least one method step a packaging part (32*a*; 32*b*) that is transported via several movable platforms (30*a*; 30*b*) is rotated around at least one axis by a relative movement of the movable platforms (30*a*; 30*b*).

8. The method according to claim 1, wherein the packaging parts (32*a*; 32*b*) are transported by the transport device (14*a*; 14*b*) along one of at least two different possible predetermined production paths (38*a*, 40*a*, 42*a*; 38*b*, 40*b*), wherein for checking a processing step in at least one method step packaging parts (32*a*; 32*b*) are conveyed on a movable platform (30*a*; 30*b*), instead of via one of the production paths (38*a*, 40*a*, 42*a*; 38*b*, 40*b*), onto another production path (38*a*, 40*a*, 42*a*; 38*b*, 40*b*).

9. The method according to claim 1, wherein in at least one method step products are put into packagings (12*a*) or packaging parts (32*a*) during a transport by the transport device (14*a*), wherein at least one movable platform (30*a*) actuates a product feed (24*a*) of a plurality of product feeds (24*a*) depending on an availability of products at the respective product feed (24*a*).

10. The method according to claim 1, wherein in at least one method step a plurality of different packaging types are produced at least substantially simultaneously by the transport device (14*a*; 14*b*), wherein for producing one of the packaging types, the movable platforms (30*a*; 30*b*) of the transport device (14*a*; 14*b*) are moved, depending in each case on a type of a packaging part (32*a*; 32*b*) transported via the respective platform (30*a*; 30*b*), on a predetermined production path (38*a*, 40*a*, 42*a*; 38*b*, 40*b*) that is assigned to the respective packaging type.

11. A packaging system (10*a*; 10*b*) for executing the method (100*a*; 100*b*) for producing packagings (12*a*; 12*b*) according to claim 1, wherein the packaging system comprises: at least one transport device (14*a*; 14*b*) for conveying packaging parts (32*a*; 32*b*), wherein the transport device (14*a*; 14*b*) comprises a planar drive, at least one platform (30*a*; 30*b*) which is movable by the planar drive and at least one stator (26*a*; 26*b*) which forms an effective surface (28*a*; 28*b*) relative to which the at least one platform (30*a*; 30*b*) is moveable via the stator (26*a*; 26*b*), wherein a movement of the at least one platform (30*a*; 30*b*) is realized by a reluctance force between the stator (26*a*; 26*b*) and the at least one platform (30*a*; 30*b*), wherein the at least one platform (30*a*; 30*b*) is moveable in a direction that is oriented transversely to the stator (26*a*; 26*b*) so as to at least partly deform the packaging parts (32*a*; 32*b*) in at least one processing step, wherein the packaging system (10*a*; 10*b*) implements by the transport device (14*a*; 14*b*) a plurality of production paths (38*a*, 40*a*, 42*a*, 38*b*, 40*b*, 42*b*).

12. A method (100*a*; 100*b*) for producing packagings (12*a*; 12*b*), wherein in at least one method step packaging parts (32*a*; 32*b*) are conveyed by a transport device (14*a*; 14*b*) having a planar drive, wherein the packaging parts (32*a*; 32*b*) are in each case moved via at least one platform (30*a*; 30*b*) of the transport device (14*a*; 14*b*) which is movable by the planar drive, and are processed during a movement that is induced by the platform (30*a*; 30*b*), wherein at least one processing step for producing a packaging (12*a*; 12*b*) from a packaging part (32*a*; 32*b*) is realized at least partly by a force generated by the at least one movable platform (30*a*; 30*b*), wherein in at least one method step a plurality of different packaging types are produced at least substantially simultaneously by the transport device (14*a*; 14*b*), wherein for producing one of the packaging types, the movable platforms (30*a*; 30*b*) of the transport device (14*a*; 14*b*) are moved, depending in each case on a type of a packaging part (32*a*; 32*b*) transported via the respective platform (30*a*; 30*b*), on a predetermined production path (38*a*, 40*a*, 42*a*; 38*b*, 40*b*) that is assigned to the respective packaging type.

13. A packaging system (10*a*; 10*b*) for executing the method (100*a*; 100*b*) for producing packagings (12*a*; 12*b*) according to claim 12, wherein the packaging system comprises: at least one transport device (14*a*; 14*b*) for conveying packaging parts (32*a*; 32*b*), wherein the transport device (14*a*; 14*b*) comprises a planar drive, at least one platform (30*a*; 30*b*) which is movable by the planar drive and at least one stator (26*a*; 26*b*) which forms an effective surface (28*a*; 28*b*) relative to which the at least one platform (30*a*; 30*b*) is moveable via the stator (26*a*; 26*b*), wherein a movement of the at least one platform (30*a*; 30*b*) is realized by a reluctance force between the stator (26*a*; 26*b*) and the at least one platform (30*a*; 30*b*), wherein the at least one platform (30*a*; 30*b*) is moveable in a direction that is oriented transversely to the stator (26*a*; 26*b*) so as to at least partly deform the packaging parts (32*a*; 32*b*) in at least one processing step, wherein the packaging system (10*a*; 10*b*) implements by the transport device (14*a*; 14*b*) a plurality of production paths (38*a*, 40*a*, 42*a*, 38*b*, 40*b*, 42*b*).

* * * * *